United States Patent [19]

Bruce, III

[11] 4,331,696

[45] May 25, 1982

[54] EXTRA THIN-FLAKED R & G COFFEE WITH STRUCTURAL INTEGRITY AND INCREASED EXTRACTABILITY

[75] Inventor: Harry W. Bruce, III, Cincinnati, Ohio

[73] Assignee: The Procter & Gamble Company, Cincinnati, Ohio

[21] Appl. No.: 266,269

[22] Filed: May 22, 1981

Related U.S. Application Data

[63] Continuation of Ser. No. 147,027, May 7, 1980, abandoned, which is a continuation of Ser. No. 958,088, Nov. 6, 1978, abandoned.

[51] Int. Cl.$^3$ .............................................. A23F 5/12
[52] U.S. Cl. .................................... 426/595; 426/443; 426/468
[58] Field of Search ................ 426/594, 595, 388, 443, 426/468

[56] References Cited

U.S. PATENT DOCUMENTS

| | | | |
|---|---|---|---|
| 3,615,667 | 10/1971 | Joffee | 426/388 |
| 3,660,106 | 5/1972 | McSwiggin et al. | 426/595 X |
| 3,769,031 | 10/1973 | McSwiggin | 426/388 X |
| 4,110,485 | 8/1978 | Grubbs et al. | 426/595 |

*Primary Examiner*—Joseph M. Golian
*Attorney, Agent, or Firm*—Rose Ann Dabek; Leonard Williamson; Richard C. Witte

[57] ABSTRACT

Extra-thin flaked roast and ground coffee with structural integrity and increased extractability for a less acidic beverage and a novel process for making same are disclosed.

14 Claims, No Drawings

EXTRA THIN-FLAKED R & G COFFEE WITH STRUCTURAL INTEGRITY AND INCREASED EXTRACTABILITY

This is a continuation, of application Ser. No. 147,027, filed May 7, 1980 abandoned, which is a continuation of Ser. No. 958,088, filed Nov. 6, 1978, now abandoned.

TECHNICAL FIELD

The present invention relates to roast and ground thin-flaked coffee. The present invention also relates to a novel method of preparing thin-flaked roast and ground coffee.

BACKGROUND OF THE INVENTION

Numerous attempts have been made in the past to increase the extractability of roast coffee of those flavorful water-soluble constituents often referred to as brew solids. That is, attempts have been made to increase the amount of brew solids which are able to be extracted from a given weight of coffee from which a coffee brew is made.

It has long been known that the extractability of roast coffee could be increased by grinding the coffee to finer particle sizes. However, roast coffee products ground to very fine grinds have bed-permeability characteristics which inhibit the extraction of the water-soluble constituents due to bed compaction, pooling, channeling, etc. To avoid such brewing problems, it has been conventional to provide roast coffee ground to mixtures of variously sized particles, such as the traditional grinds of "regular", "drip" and "fine".

Other than adjusting the particle size distribution by grinding, relatively little effort has been directed toward altering the fundamental physical characteristics of coffee. Green coffee beans have been roll-milled prior to roasting and grinding to increase the extractability of coffee (see U.S. Pat. No. 2,123,207, issued July 12, 1938 to Rosenthal). Roast and ground coffee has been light-milled to provide a coffee product which has the same bulk appearance as conventional roast and ground coffee but which has increased extractability (see U.S. Pat. No. 3,769,031, issued Oct. 26, 1973 to J. R. McSwinggin). Flaked green coffee has also been subjected to compressive and shear forces via extruder roasting to provide a roast coffee product which yields higher soluble solids (see, for example, U.S. Pat. No. 3,762,930, issued Oct. 2, 1973 to J. P. Mahlmann). Although these efforts may result in some level of improvement in extracting desirable coffee flavor constituents, further enhancement of coffee's extractability is provided by flaked roast and ground coffee.

Roast and ground coffee has been transformed into flaked coffee by roll milling the roast and ground coffee (see, for example, U.S. Pat. No. 1,903,362, issued Apr. 4, 1933 to R. B. McKinnis and U.S. Pat. No. 2,368,113, issued Jan. 30, 1945 C. W. Carter). Thick-flaked (i.e., flaked coffee having an average flake thickness greater than 0.008 inch) roast and ground of enhanced extractability is disclosed by Joffe in U.S. Pat. No. 3,615,667, issued Oct. 26, 1971 as well as a method for its production in U.S. Pat. No. 3,660,106, issued May 2, 1972 to J. R. McSwiggin et al. A visually appealing high-sheen flaked roast and ground coffee of improved extractability is disclosed in U.S. Pat. No. 4,110,485, issued Aug. 29, 1978 to Grubbs.

In contrast to the consumer acceptability of thick-flaked roast and ground coffee, both the Joffe '667 patent and the McSwiggin '106 patent teach that thin-flaked coffee having an average flake thickness of less than 0.008 inch is taught to be consumer-unacceptable. The thin-flaked coffee produced by such prior art methods is described as having a "cellophane-like" nature and, therefore, visually unappealing. Moreover, the "cellophane-like" thin flakes are also disclosed as being undesirably fragile and have both an unacceptably low and a variable bulk density (Joffe '667, Column 8, lines 46-54).

The prior art teaches that the fragile nature of the thin flakes of the prior art leads to product breakup during normal packaging, transportation and handling. The product breakup is accompanied by the flakes aligning themselves in parallel planes producing a very compact product with a bulk density substantially higher than that of roast and ground coffees presently marketed. When the parallel plane alignment takes place after packaging, there occurs an objectionable increase in container outage (i.e. the space between the upper surface of the product and the upper surface of the container). Large container outages are viewed negatively by the consumer. Thus, the thin-flaked roast and ground coffee produced by art-known methods is consumer unacceptable.

Given the state of the coffee art as described above, there is a continuing need to provide a roast and ground coffee product which provides improved extractability of soluble brew solids and which possesses consumer acceptable physical properties and appearance. Accordingly, it is an object of the present invention to provide a roast and ground coffee product exhibiting desirable organoleptic and physical properties.

The methods known in the art for preparing flaked roast and ground coffee comprise passing roast and ground coffee through a roll mill under particular conditions of roll pressure, roll peripheral speed, roll temperature, roll diameters, and flake moisture content. While known methods of making flaked coffee having realized thick-flaked roast and ground coffee which provides an extractability advantage compared to conventional roast and ground coffee and possesses consumer acceptable flake physical properties, these methods have been unable to produce thin-flaked roast and ground coffee exhibiting desirable physical properties.

SUMMARY OF THE INVENTION

It has been surprisingly discovered that a superior coffee product is provided by a thin-flaked roast and ground coffee product having a minimum amount of coffee flakes which have a flake thickness within a very select flake thickness range.

The present invention provides a method for preparing that thin-flaked roast and ground coffee which exhibits enhanced extractability and yet possesses consumer-acceptable flake physical properties. It has been surprisingly discovered that the thin-flaked roast and ground coffee of superior extractability and structural integrity is provided by the novel flaking method described herein, comprising flaking roast and ground coffee having a particle size within a very select size range and moisture level by roll milling the unflaked R&G coffee under particular roll mill operating conditions.

DETAILED DESCRIPTION OF THE INVENTION

The present invention relates to thin-flaked roast and ground coffee products of improved extractability of the water-soluble flavor constituents. There is further provided herein an improvement in the coffee flaking process enabling the provision of the thin-flaked coffee product herein.

THIN-FLAKE COFFEE

In the provision of a thin-flaked roast and ground coffee product of enhanced extractability and low acidity, it is essential to control the flake thickness, particle size distribution, bulk density and flake moisture content in order to insure its consumer acceptability. Each of these coffee product properties, as well as product preparation and product use, are described in detail as follows:

A. Flake Thickness

The improved coffee flaking process described hereinafter can provide flakes of almost any desired thickness. However, it has been surprisingly discovered that a flaked coffee product of superior increased extractability of the desirable coffee flavor constituents can be realized if the thickness of the coffee flakes are within a very select flake thickness range. The terms "coffee flakes" or "flaked coffee", as used interchangeably herein, refer to compressed roast and ground coffee. The term "flake thickness" as used herein means the average thickness of the flakes passing through a No. 12 U.S. Standard Sieve and remaining on a No. 16. The improved thin-flaked coffee product provided herein comprises flaked roast and ground coffee wherein about 80% to about 98% by weight of the flakes have a flake thickness ranging from about 0.1 mm to about 0.2 mm (i.e. about 0.004 inch to 0.008 inch), preferably about 0.125 to about 0.175 mm. Such thin flakes provide improved extractability of the water-soluble coffee constituents compared to the thicker flaked coffee products disclosed by the prior art or commercially sold.

While not wishing to be bound by the proposed theory, it is believed that the increased extractability compared to prior art flaked coffee, particularly flaked coffee having a flake thickness exceeding 0.2 mm, is due to the increased internal cellular disruption of the thin coffee flakes made by the process of this invention. Although the prior art teaches that thicker coffee flakes have 70% to 85% of the coffee cells disrupted, as revealed by microscopic evaluation, such cellular disruption is evident only in the planar surface regions of the prior art flakes. Microscopic evaluation of a "cross-section" of such thicker coffee flakes surprisingly reveals that the cellular disruption indicated is confined to the regions near the surface of the flake plane. A cross-section of the thin-flaked coffee of the present invention, however, reveals that substantially all, i.e. from 50% to almost 100%, of the cells exposed from a cross-section view of the thin flakes of the present invention are disrupted. That is, the cellular disruption speculated to be responsible for increased extractability is not confined to the surface regions of the flake. The cellular disruption of the interior of the thin-flaked coffee herein is believed caused by the particular combination of conditions herein disclosed, including a more severe compressive force required to transform the relatively large "coarse" grind size roast and ground coffee feed into the thinner thin-flaked coffee of the present invention, as explained in more detail below.

The greater extractability provided by the novel thin-flaked coffee provided herein enables more cups of equal-brew strength and flavor to be brewed from a given amount of coffee. The normal method of measuring the strength of a coffee brew is to measure the percent soluble solids which is more commonly referred to as brew solids. This measurement can be made by oven-drying the brewed coffee and weighing the remainder. The percent soluble solids can also be ascertained optically by measuring the index of refraction of the coffee brew. The index of refraction is correlated to brew solids as measured by the oven-drying technique. Although the extractability of acidity constituents is also increased, it has been surprisingly found that the increase is proportionately smaller than the increase in flavor constituents. Therefore, not only could more cups of equal-brew strength be brewed from a given amount of thin-flaked coffee, but the equal-brew strength cups would also have lower titratable acidity.

The thin-flaked coffee provided herein can be made from a variety of roast and ground coffee blends including those which may be classified for convenience and simplification as low-grade, intermediate grade and high-grade coffees. Examples and blends thereof are known in the art and illustrated in, for example, U.S. Pat. No. 3,615,667 (issued Oct. 26, 1971 to Joffe) incorporated herein by reference in its entirety.

Decaffeinated roast and ground coffee can also be used herein to make a decaffeinated thin-flaked coffee product. As is known in the art, the removal of caffeine from coffee products frequently is accomplished at the expense of the removal of certain other desirable components which contribute to flavor. The tendency of decaffeinated products to be either weak or deficient in flavor has, thus, been reported in the literature. The provision of thin-flaked coffee made from decaffeinated roast and ground coffee by the novel thin-flaking method of the present invention provides a compensatory advantage. The added flavor and strength advantages achievable by enhanced extractability permits realization of levels of flavor and brew strength which might otherwise not be attainable in the case of a conventional decaffeinated roast and ground product.

Typically, decaffeination of coffee is accomplished by solvent extraction prior to the roasting of green coffee beans. Such decaffeination methods are well known in the art. After roasting, the decaffeinated beans are ground to the suitable particle size, described in more detail below, and are thereafter roll-milled according to the method of the present invention which is also described in more detail below.

B. Particle Size Distribution

As noted above, the thin-flaked coffee provided herein has a flake thickness within a select, very particular thickness range. It is also important to control the dimension which characterizes the particle size of the coffee flakes. It is conventional in the coffee art to describe coffee particle size distribution, including flaked coffee, in terms of sieve fractions, i.e. that weight percentage which remains on a particular sieve or that weight percentage which passes through a particular sieve.

It has been found that coffee products comprising 60% or more of fine particles experience decreased extractability which drops dramatically as the average particle size decreases. The thin-flaked coffee products of the invention should have no more than 90% by weight passing through a No. 30 U.S. Standard screen, and preferably from about 40% to about 70% passing through a No. 30 U.S. Standard screen. This particle size distribution insures efficient extraction.

C. Bulk Density

The thin-flaked coffee product of the present development should have a bulk density of from 0.35 g./cc. to 0.50 g./cc and preferably 0.38 to 0.48 g./cc in order to assure proper performance. Fortunately, the present invention provides flakes of high structural integrity. The desirability of flakes of high structural integrity (i.e. physical strength and resistance to attrition or breakage during handling) is important because large percentages of broken flakes markedly change the product bulk density and particle size distribution, which in turn adversely affect the brewing properties of the product.

D. Flake Moisture Content

The thin-flake coffee composition disclosed herein has, on the average, a flake moisture level of from about 2.5% to about 9.0% by weight, preferably from about 3.5% to about 7.0%, and most preferably 3.5% to about 5.0%. Of course, it is recognized that individual flakes can have different individual moisture contents. However, the weight percentages of such flakes should be controlled such that the coffee product as a whole has an average moisture content within the above-given range. Moisture contents lower than 2.5% are to be avoided because the resulting flakes are very fragile and often break during process handling and packing. Too large a percentage of broken flakes in turn changes the product bulk density which if it falls without the range of from 0.35 g./cc. to 0.50 g./cc. and, as noted above, will produce a consumer-unacceptable product. On the other hand, moisture contents above 7.0% are less desirable.

Typically, flake moisture content is adjusted by varying the moisture level of the roast and ground coffee feed from which the flakes are produced. The adjustments to the feed moisture level can be controlled, for example, by controlling the amount of water used to quench and to thereby halt the exothermic roasting operation. The moisture content of the roasted beans is not appreciably affected by grinding or even by the flaking operations unless high roll surface temperatures are used.

E. Aroma-Enriched, Thin-Flaked Coffee

Penalty exacted by the flaking operation is the loss of aroma constituents usually associated with fresh roast and ground coffee. This relative deficiency in the aromas characteristic of fresh roast and ground coffee has been attributed to the loss of aroma principles during the roll milling of roast and ground coffee into flakes. Accordingly, it may be optionally desirable to aroma-enrich the thin-flaked coffee product of the present invention so as to restore or enhance the aroma to approximate that of fresh roast and ground coffee.

A variety of methods are known in the art for providing coffee products with coffee aromas, for example, U.S. Pat. Nos. 2,947,634, Aug. 2, 1960 to Feldman et al., 3,148,070, Sept. 8, 1964 to Mishkin et al., and 3,769,032, Oct. 30, 1973 to Lubsen et al., each of which is incorporated herein by reference in its entirety. These patents describe methods for aromatizing soluble powders by addition of an edible carrier oil, such as coffee oil, triglyceride vegetable oil, propylene glycol and carrying volatile coffee aromas. Aroma-enriched carrier oil is generally prepared by mixing the carrier oil with an aroma frost, allowing the mixture to equilibrate and allowing the mixture to liquify. An aroma frost can be obtained by the condensation of the aroma constituents from a variety of sources. Suitable examples of aromatizing coffee volatiles are those obtained from roaster and grinder gases and from the condensation of steam-distilled volatile aromas. Examples of suitable aroma materials are described in said U.S. Pat. Nos. 2,947,634 to Feldman et al., 3,148,070 to Mishkin et al., 2,562,206 to Nutting, 3,132,947 to Mahlmann, 3,615,665 to White et al., and Strobel U.S. Pat. No. 3,997,683.

PREPARATION OF THIN-FLAKED COFFEE

The thin-flaked roast and ground coffee of the present invention can be formed by subjecting conventional roast and ground coffee to the compressive pressures of a roll mill. The roast and ground coffee is first passed through the roll mill which comprises a pair of parallel, smooth or highly polished rolls which crush and flatten the coffee into flakes. Thereafter, the flaked coffee so produced is sized by suitable means to achieve the requisite particle size distribution.

A. Roll Milling

In the step of roll milling roast and ground coffee to produce consumer-acceptable flaked coffee, it has been found important to control at least several processing variables: particle size distribution, roll pressure, roll surface temperature, static gap, roast and ground feed moisture content, feed rate, roll peripheral surface speed, and roll diameters. These and other processing variables are described in detail hereinafter.

1. Particle Size Distribution

In marked contrast to the teachings of the art, the particle size distribution of the roast and ground coffee feed has been surprisingly discovered to be a most important process variable in the production of thin-flaked coffee of higher extractability. Prior art processes have utilized grind sizes traditionally referred to as "regular", "drip" and "fine". The standards of these grinds, as suggested in the 1948 "Coffee Grinds: Simplified Practice Recommendation R231-48", published by the Coffee Brewing Institute, Inc., New York, incorporated herein by reference in its entirety.

It has been found, however, that only larger "coarse" grind size particles are suitable in the novel method of making the thin-flaked coffee disclosed herein. The term "coarse" grind is used liberally in the coffee art to characterize grinds of widely varying particle size distributions. As used herein, "coarse" grind size indicates that the roast and ground coffee has a particle size distribution such that:

(a) from about 90% to 100% by weight is retained on a No. 30 U.S. Standard Sieve,
(b) from about 51% to 89% by weight is retained on a No. 16 U.S. Standard Sieve, and
(c) from about 20% to 50% by weight is retained on a No. 12 U.S. Standard Sieve.

The extractability advantage for flaked coffee prepared by utilizing a "coarse" size grind feed to the roll milling operation decreases rapidly as flake thickness increases beyond 0.20 mm. Stated differently, as flake thickness increases, the particle size of the feed to the roll mill becomes less significant in increasing the extractability of flaked coffee.

Typical grinding equipment and methods for grinding roasted coffee beans are described in detail in, for example, Sivetz & Foote, "Coffee Processing Technology", 1963, Vol. 1, pp. 239–250, incorporated herein by reference.

2. Roll Pressure or Force

Roll pressure will also influence the nature of the roast and ground coffee flakes obtained by the process of the present invention. Roll pressure is measured in pounds per inch of nip. In metric units it is measured in kilonewtons/meter of nip. Nip is a term used in the art to define the length of surface contact between two rolls when the rolls are at rest. To illustrate, it can be thought of as a line extending the full length of two cylindrical rolls and defining the point or line of contact between two rolls.

To produce thin-flaked roast and ground coffee of high extractability and in high yield, the roll mill should be operated at a static gap setting of less than about 0.1 mm, a roll peripheral speed of from about 150 meters/min. to about 800 meters/min., a roll surface temperature of below about 40° C., and at a pressure of about 100 kilonewtons/meter to about 400 kilonewtons/meter of nip, and wherein the rolls of said mill have a roll diameter of at least about 15 cm. In general, operable feed rates are directly related to the roll pressure. Thus, higher roll pressure allows a higher feed rate to the roll mill to produce a flake of specific thickness for otherwise equivalent operating conditions of the roll. The disadvantages of using higher roll pressures are simply mechanical, e.g. more expensive equipment is needed to produce higher roll pressures. Conversely, at low roll pressures, the feed rate can drop below commercially desirable rates.

3. Roll Surface Temperature

Control of the surface temperature of each roll has been found to be important to the provision of thin-flaked roast and ground coffee of high extractability. Roll surface temperature refers to the average surface temperature of each roll of the roll mill. The rolls can be operated at differential operating temperatures. However, operation under conditions of differential roll temperatures is not preferred.

The surface temperature of each of the respective rolls can be controlled by a heat exchange fluid passing through the inner core of the rolls. Generally, the fluid, which is most often water, is heated or cooled and passed through the inside of the rolls. The result is that the roll surface which is usually a smooth, highly polished steel surface, is subjected to temperature control by means of heat transfer. Of course, in actual operation the surface temperature will not be exactly the same as the temperature of the heat exchange fluid and will be somewhat higher because milling of coffee particles to produce flakes tends to increase the roll surface temperature. Accordingly, determination of the temperature of the exchange fluid necessary to maintain any specific roll surface temperature will depend upon several factors, such as the kind of metal the roll is made of, the roll wall thickness, the speed of operation of the roll mills, and the nature of the heat exchange fluid employed.

To produce the thin-flaked roast and ground coffee of the present invention, it is essential that the roll surface temperature be less than about 40° C., preferably between about 5° C. to 30° C.

4. Static Gap

As used herein, the term "static gap" represents that distance separating the two roll mills along the line of nip while at rest and is typically measured in mils. A special condition of roll spacing is "zero static gap" which is used herein to indicate that the two rolls are in actual contact with each other along the line of nip when the roll mills are at rest. As roast and ground coffee is fed into the roll mills and drawn through the nip, it causes the rolls to deflect an amount which is dependent upon the roll peripheral speed, roll pressure, and coffee feed rate. Accordingly, the thin-flaked coffee of the present invention can be made even when the roll mills are set at zero static gap. Because of the deflecting action of the coffee feed as it passes through the roll mill, the static gap setting must be less than the desired flake thickness. Suitable static gap settings range from 0 (i.e. from a zero gap setting) up to about 0.1 mm. Preferably, the gap setting ranges from about 0 to about 0.1 mm.

In the most preferred method of practice, a zero static gap spacing of the roll mills is employed. Differential roll peripheral surface speeds are to be strictly avoided when the roll mills are set for zero static gap operation. Contact along the line of nip between rolls operating at differential peripheral surface speeds can cause severe physical damage to the roll mill. Differential roll peripheral surface speeds can be utilized, however, with static gap spacings exceeding about 0.05 mm.

5. Moisture Content

In producing consumer-acceptable flaked roast and ground coffee, it is essential that the average flake moisture content be from about 2.5% to 9.0% by weight, with 3.5% to 7.0% being preferred. Since the moisture level of the coffee particles is not significantly affected by the flaking operation, the moisture level of the thin-flaked coffee product herein can be controlled by controlling the moisture content of the roast and ground coffee feed. Consequently, the average moisture content of the roast and ground coffee particles to be flaked should be within the range of from about 2.5% to about 9.0%. Flaked roast and ground coffee particles having lower moisture levels tend to be more brittle, which leads to the production of an undesirably high level of fines.

6. Feed Rate

The feed rate to the roll mill is that amount of material per hour per meter of nip which is fed into the nip area. The throughput rate is the amount of material per hour per meter of nip that actually passes through the roll mill. When the feed rate exceeds the throughput rate, a condition occurs which is referred to in the art as "choke feeding". Conversely, when the feed rate falls below the theoretical throughput rate, the feed rate and throughput rate are the same. This condition is referred to in the art as "starve feeding". Starve feeding offers the particular process advantages such as increased process control, increased equipment life, and increased process flexibility and is, therefore, the more suitable mode of operation in the method of the present invention.

7. Roll Peripheral Surface Speed

Control of the peripheral surface speeds of the rolls has also been found to be important to the provision of the thin-flaked roast and ground coffee herein. The roll peripheral surface speed is measured in meters per minute of roll surface circumference which passes by the nip. Generally, the roll mill should be operated at a roll speed of from about 150 meters/min. to 800 meters/min., preferably from about 200 meters/min. to about 700 meters/min.

For a given set of roll mill operating conditions, the throughput rate, the roll peripheral surface speed and the thickness of the flaked coffee produced are closely related. In the production of flaked coffee of a specified thickness, the throughput rate is directly related to the roll peripheral surface speed. Thus, an increase in the roll peripheral surface speed allows an increase in the throughput rate in producing flakes of specified thickness. When a constant throughput rate is maintained (e.g. by controlling the feed rate), higher roll peripheral surface speeds produce thinner flakes and conversely, lower roll peripheral surface speeds produce thicker flakes. If the throughput rate is increased, the roll peripheral surface speed must be increased to maintain the production of flakes of a desired thickness.

While peripheral surface roll speeds have been set forth in connection with operation of a roll mill to provide thin-flaked coffee of improved extractability, it will be appreciated that optimal speeds will be determined in part by the other roll mill conditions, such as the size of the rolls employed, the static gap setting, etc., as well as the physical and organoleptic properties desired in the flaked product.

8. Roll Diameters

The process of the present invention can be practiced with the aid of any of a variety of roll mills of various roll diameters capable of subjecting roast and ground coffee to mechanical compressing action and adapted to the adjustment of roll pressure, roll speed and roll temperature. Suitable mills are those having two parallel rolls so that coffee particles passed between the rolls are crushed or flattened into flakes. Normally, smooth or highly polished rolls will be employed as they permit ready cleaning; other rolls can, however, be employed if the desired flaking effects can be obtained.

In the selection of suitable roll mill equipment attention should be given to the diameters of rolls. The diameter of the roll mills, while it controls the angle of entry into the nip which in turn affects flake thickness and bulk density, is not critical per se. While rolls smaller than about 15 cm in diameter can be employed to flake coffee, roll mills having a diameter of less than about 15 cm tend to hamper passage of the coffee through the mill by a churning effect which decreases throughput and efficiency. If available, roll mills of even as high as 122 cm in diameter should be suitable. However, good results are obtained from mills having diameters in the range of from 15 to 76 cm. Examples of suitable mills which can be adapted in known manner to operation within the parameters defined hereinbefore include any of the well-known and commercially available roll mills, such as those sold under the tradenames of Lehmann, Thropp, Ross, Farrell and Lauhoff.

B. Screening

After the roast and ground coffee feed has been flaked by being passed through the roll mill, it is essential that the thin-flaked coffee produced goes through a sizing operation so as to insure that the thin-flaked coffee product has a particle size distribution as described below. Impurities in the roast and ground coffee feed to the roll mill typically produce oversized flakes which can be readily removed by the sizing operation. And too, since operation of the roll mill within the parameter ranges given above can result in a secondary grinder effect, the sizing operation can serve to remove an undesirable level of fine particles.

A wide variety of suitable sizing methods and apparatus are known in the art (see, for example, "Perry's Handbook for Chemical Engineers", McGraw-Hill Book Co., pp. 21-46 to 21-52, incorporated herein by reference). For example, the thin-flake coffee can be effectively screen-sized by dropping the thin-flaked coffee particles from a hopper, chute or other feeding device into a mechanically vibrating screen or into a multiple sieve shaker such as those marketed by Newark Wire Cloth Company and the W. S. Tyler Company. Typically, the sizing operation separates the flaked coffee of various particle sizes into desired size fractions in less than one minute. Such equipment typically have exit or drawoff ports which allow the withdrawal of oversize or plus material. Such drawoff parts also allow withdrawal of fines (i.e. through a No. 30 U.S. Standard Sieve) so as to achieve a sieve analysis or particle size distribution such that a thin-flaked coffee product is produced such that about 30% to about 90% by weight passes through a No. 30 U.S. Standard Sieve.

The following examples are offered to further illustrate but not limit the invention disclosed herein.

EXAMPLE I

Seventy pounds of a blend comprising 30% high quality Arabicas, 30% Brazils, and 40% Robustas are roasted in a Probat/Jubilee roaster to endpoint temperatures within the range of from about 230° C. to 260° C. in about 12 min. total roast time. The roasted beans are quenched with about 6.75 liters of water. The roast coffee is then halved into two portions. One half is used for a control production of thick-flaked roast and ground coffee, while the remaining half is utilized for the production of thin-flaked roast and ground coffee.

Portions of the above-blended roast coffee beans are ground coarser than a regular grind size in a Gump pilot grinder. A sample of the ground coffee is taken for analysis. A sieve screen analysis indicates that 30% by weight remains on a No. 12 U.S. Standard sieve, 70% by weight is retained on a No. 16 U.S. Standard sieve, while 85% by weight remains on a No. 20 U.S. Standard sieve and 95% by weight remains on a No. 30 U.S. Standard sieve. The moisture level is about 4.4% by weight. The coarse grind size roast and ground coffee is starve-fed by dropping a cascade of the particles into the rolls of a "Ross" two-roll mill set at zero static gap, each roll being of about 46 cm diameter. The feed rate is about 575 kg/meter of nip per hour, while the roll pressure is adjusted to provide a pressure of 250 kilonewtons/meter of nip. Each roll is operated at a peripheral surface speed of about 300 meters per minute and at an average roll surface temperature of about 16° C. The thin-flaked coffee particles dropping from between the rolls are gravity-fed into a hopper. The result sieve analysis is: about 50% passes through a No. 30 U.S. Standard sieve. The product had a bulk density of 0.44 g./cc. and a moisture level of 4.4% by weight.

The flaked coffee product is characterized by an average flake thickness of 0.16 mm in the following manner: 100 grams of the thin-flaked coffee is poured onto U.S. Standard No. 12 circular sieve and is agitated by a "Ro-Tap" sieve shaker (manufactured by U.S. Tyler Co.) for three minutes. The thin-flaked coffee which passes through the No. 12 sieve is thereafter similarly screened using a U.S. Standard sieve No. 16. From the portion remaining on the No. 16 sieve, ten

(10) representative flakes from the portion remaining on the No. 16 sieve are selected for flake thickness measurement. Each representative thin-flake particles are measured for thickness using a Starrett Model 1010 gauge manufactured by L. S. Starrett Co. The ten-flake thickness measurements are averaged to characterize the average flake thickness.

The thin-flaked coffee product prepared in the above-described manner exhibits increased extractability of the water-soluble constituents and produces a coffee brew characterized by lower acididty.

EXAMPLE II

The second half of the roast portion referred to hereinbefore was ground to a "regular" grind particle size and was made into thick flakes by a control process utilizing the roll mill described in Example I, except that each roll was adjusted to a static gap setting of about 0.75 mm, to the peripheral surface speed of 30 meters per minute, and to a roll surface temperature of 21° C. Starve feeding at a rate of 1700 kg per hour per meter of nip and a roll pressure of 175 kilonewtons per meter of nip is employed. The thick-flaked coffee that is removed from the roll mill is characterized by a thickness of 0.38 mm. This product corresponds to a prior art flaked coffee product made in accordance with the process disclosed in U.S. Pat. No. 3,615,667, issued Oct. 26, 1971 to F. M. Joffc.

EXAMPLE III

Some thin-flaked coffee is made using a prior art flaking method, as follows:

Three hundred pounds of a blend comprising 30% high quality Arabicas, 30% Brazils and 40% Robustas are roasted in a Thermalo roaster to endpoint temperature within the range of 230° C.–260° C. in about 10 minutes total roast time. The roasted beans are quenched with about 29.5 liters of water.

The roast coffee is ground to a "regular" grind particle size and made as described by McSwiggin, U.S. Pat. No. 3,660,106.

Each roll was adjusted to zero static gap, to the peripheral surface speed of about 120 meters per minute, and to a roll surface temperature of about 65° C. Starve feeding at a rate of about 1340 kg per hour per meter of nip and a roll pressure of about 250 kilonewtons per meter of nip is employed. The thin-flaked coffee particles dropping from between the rolls are gravity-fed into a hopper. The resultant sieve analysis is: about 20% by weight passes through a 30 mesh U.S. Standard sieve. The product has a bulk density of 0.42 gm/cc and a moisture level of 6.1% by weight. The thin-flaked coffee product is characterized by an average flake thickness of 0.21 mm.

MICROSCOPIC EVALUATION TEST

Samples of the flakes from Examples I and II were microscopically viewed and photographed to determine and compare the degree of cellular disruption.

Embedding Procedure for Coffee Sections

For each sample received, 10–15 flakes of coffee are placed in each of two small round plastic vials, 15 mm in diameter and 8.5 mm in height. Epoxy is then added to the vials, to the upper edge. The composition of the epoxy is:

26 grams—Nonenyl Succinic Anhydride ™
10 grams—Bakelite Epoxy Resin ERL-4206 ™
8 grams—Epoxy Resin DER-736 ™
0.4 grams—Dimethylaminoethanol If the coffee pieces float to the surface of the epoxy, the vials are placed in a vacuum of 30 mm of mercury absolute pressure for approximately 5 minutes. If the pieces do not sink when the vacuum is released, the procedure is repeated until they do.

The vials are then held at 70° C. overnight ($\sim$16 hours) to care (harden) the epoxy. After curing, the plastic vial is cut away from each block, and the blocks are mounted in a hand-operated microtome. The microtome is set to cut sections 15$\mu$ thick. Sections are cut from both blocks for each sample and mounted in mineral oil on glass slides for examination and photographs.

The sections are examined and photographed on a "Zeiss Universal" Microscope equipped with a 35 mm camera using Kodachrome II Professional color film. The thin coffee flakes of Example I of the present invention had from 50% to about 100% of their microscopic observable internal and surface cells disruped. However, the coffee flakes of Example II had from up to about 100% of their cells in the planar surface regions disrupted—their internal cells were somewhat distorted but a majority of those cells were observably undisrupted. Disruption as used herein means that a cell wall is observably fractured or substantially unidentifiable as cells at magnification of about 35X.

Extraction Tests

The enhanced extractability of the thin-flaked coffee of the present invention compared with prior art coffees as a reference is demonstrated by the following procedure: A drip coffee extraction is performed by charging 57.0 g. of coffee to a Bunn OL20 12-cup coffee maker and allowing the coffee to be drip brewed. The brew is cooled to room temperatures and analyzed for solids content by index of refraction The drip extraction is performed on (1) the invention, the thin-flaked roast and ground coffee product of Example I, (2) the thick-flaked coffee product of Example II, (3) a retail flaked roast and ground coffee, (4) a commercial flaked roast and ground coffee, and (5) a prior art thin-flaked coffee. The results of such extraction tests are set forth in the following Table 1.

TABLE 1

| Coffee | Brew Solids Wt./% | Titratable Acidity ml/g Brew Solids |
|---|---|---|
| 1. Example I (Invention) | 0.88 | 4.9 |
| 2. Example II (Joffe - thick-flaked) | 0.79 | 5.4 |
| 3. Retail flaked roast and ground coffee | 0.76 | 5.6 |
| 4. Commercial flaked roast and ground coffee | 0.79 | 5.4 |
| 5. Example III (McSwiggin - thin-flaked) | 0.82 | 5.2 |

As is apparent from an inspection of the data in Table 1, the thin-flaked coffee of this invention, Coffee 1, provided a substantially higher extractability of brew solids and a substantially lower titratable acidity as compared with the prior art flaked coffees 2 and 5 and marketed thick-flaked coffees 3 and 4.

What is claimed is:

1. A method of flaking roast and ground coffee to provide a thin flaked coffee product having improved structural integrity and enhanced extractability for a less acidic beverage, said method comprising the steps of:
   (1) passing through a roll mill coarse roast and ground coffee having a coarse particle size distribution such that:
      (a) from about 90% to 100% by weight is retained on a No. 30 U.S. Standard Screen,
      (b) from about 51% to 89% by weight is retained on a No. 16 U.S. Standard Screen, and
      (c) from about 20% to 50% by weight is retained on a No. 12 U.S. Standard Screen,
   (2) operating said roll mill:
      (a) at a static gap setting of less than about 0.1 mm.,
      (b) a roll peripheral speed of from about 150 meters/min. to about 800 meters/min.,
      (c) a roll temperature of below about 40° C., and
      (d) at a pressure of about 100 kilonewtons/meter to about 400 kilonewtons/meter of nip, and
   wherein the rolls of said roll mill have a roll diameter of at least about 15 cm, and
   wherein the resultant thin flaked coffee comprises:
   thin flakes of roast and ground coffee, wherein about 80% to about 98% by weight of said flakes have an average thickness of from about 0.1 mm. to about 0.175 mm.,
   said improved roast and ground coffee product having a particle size distribution such that about 30% to about 90% by weight of said product passes through a No. 30 U.S. Standard sieve,
   said product having a tamped bulk density of from about 0.35 g./cc. to about 0.50 g./cc., and
   a moisture content of from about 2.5% to about 9.0% by weight.

2. The method of claim 1 wherein said operating roll force is from about 200 kilonewtons to about 400 kilonewtons per meter of nip.

3. The method of claim 1 wherein said coarse roast and ground coffee has a moisture content of from about 3.5% to about 7% by weight.

4. The method of claim 1 wherein said thin flakes have an average thickness of less than about 0.175 mm.

5. The method of claim 1 wherein said thin flaked coffee product has a moisture content of from about 3.5% to about 5%, and wherein about 40% to about 70% of said product passes through a No. 30 U.S. Standard sieve.

6. The method of claim 1 wherein said operating roll temperature is from about 5° C. to about 30° C.

7. The method of claim 1 wherein said thin flakes have about 70% to about 85% of their microscopic observable internal and surface cells disrupted and yet said flakes have substantial structural integrity to provide a substantially non-fragile non-cellophanelike improved thin-flaked coffee product.

8. The method of claim 1 wherein said thin flakes have at least 50% of their microscopic observable internal and surface cells disrupted.

9. The method of claim 1 wherein said tamped bulk density is from about 0.38 to about 0.48.

10. The product produced by the process claimed in claim 7.

11. The improved roast and ground coffee product of claim 10 wherein said moisture content is from about 3.5% to about 7%, and wherein about 40% to about 70% of said product passes through a No. 30 U.S. Standard sieve.

12. The improved roast and ground coffee product of claim 10 wherein said thin flakes have a substantial portion of their microscopic observable internal and surface (cells disrupted and yet have substantial structural integrity to provide a substantial non-fragile improved thin flaked coffee product.

13. The improved roast and ground coffee product of claim 4 wherein said thin flakes have at least about 50% of said internal and surface cells disrupted.

14. The improved roast and ground coffee product of claim 4 wherein said thin flakes have about 70% to about 85% of said internal and surface cells disrupted.

* * * * *

UNITED STATES PATENT AND TRADEMARK OFFICE
CERTIFICATE OF CORRECTION

PATENT NO. : 4,331,696
DATED : May 25, 1982
INVENTOR(S) : Harry W. Bruce, III

It is certified that error appears in the above-identified patent and that said Letters Patent are hereby corrected as shown below:

Col. 1, line 46, "McSwinggin" should be --McSwiggin--.

Col. 1, line 59, before "C. W. Carter" insert --to--.

Claim 10, col. 14, line 25, "Claim 7" should be --Claim 1--.

Claim 12, col. 14, line 34, delete the "(" before "cells".

Claim 13, col. 14, line 38, "Claim 4" should be --Claim 12--.

Claim 14, col. 14, line 41, "Claim 4" should be --Claim 12--.

Signed and Sealed this

Second Day of November 1982

[SEAL]

Attest:

GERALD J. MOSSINGHOFF

Attesting Officer    Commissioner of Patents and Trademarks